No. 694,521. Patented Mar. 4, 1902.
B. W. BEGEER.
CYANID PROCESS OF EXTRACTING PRECIOUS METALS FROM ORES.
(Application filed Oct. 21, 1901.)
(No Model.)
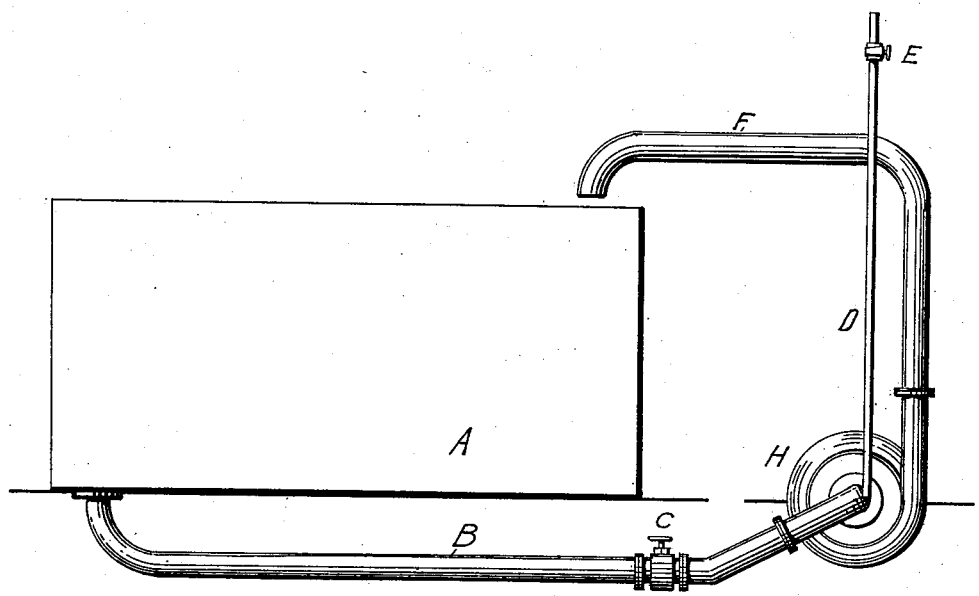
WITNESSES:
INVENTOR.
B.W. Begeer.
BY
ATTORNEY.

UNITED STATES PATENT OFFICE.

BASTIAAN WILLEM BEGEER, OF FLORENCE, COLORADO, ASSIGNOR OF ONE-HALF TO JEREMIAH M. HOWER, JR., OF FLORENCE, COLORADO.

CYANID PROCESS OF EXTRACTING PRECIOUS METALS FROM ORES.

SPECIFICATION forming part of Letters Patent No. 694,521, dated March 4, 1902.

Application filed October 21, 1901. Serial No. 79,375. (No specimens.)

*To all whom it may concern:*

Be it known that I, BASTIAAN WILLEM BEGEER, a citizen of the Netherlands, residing at Florence, in the county of Fremont and State of Colorado, have invented certain new and useful Improvements in Processes of Separating Precious Metals from Their Ores; and I do declare the following to be a full, clear, and exact description of the invention, such as will enable others skilled in the art to which it appertains to make and use the same, reference being had to the accompanying drawing, and to the letters of reference marked thereon, which form a part of this specification.

My invention relates to an improved cyaniding process for the separation of the precious metals from their ores, tailings, &c.

Gold is dissolved in a solution of cyanid of potassium according to the following equation:

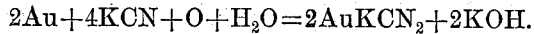

$$2Au + 4KCN + O + H_2O = 2AuKCN_2 + 2KOH.$$

This demonstrates that a certain amount of oxygen is absolutely necessary to the process. The quickest and best possible extraction of gold and silver from ores or from any other gold-bearing or silver-bearing matter by solution of cyanid of potassium will thus be effected in the presence of an excess of oxygen—*i. e.*, an amount of oxygen in excess of the amount required by the above equation. This amount of oxygen must be capable of taking part in the reaction, and therefore be intimately mixed with the solution thus in a state of solution in the cyanid liquid.

I am aware that a certain solution is capable of absorbing only a definite amount of oxygen, depending on pressure, temperature, and character of the solution. By an "excess" of oxygen I mean more oxygen than the amount required for the solution of the gold, according to the above equation.

With my invention it is possible to dissolve in the cyanid solution in a very short time the maximum amount of oxygen which the solution is capable of dissolving under the given circumstances of pressure, temperature, and character of the solution, and this will be, as a rule, an excess of oxygen, as already explained.

The ratio of gold and silver bearing matter to solution of cyanid in leaching is about three to one, and in agitation about one and one-half to one in the usual practice.

Now it is possible in some cases of rich gold ore, &c., that the amount of gold is so large that the maximum amount of dissolved oxygen is not sufficient for the solution of gold when only one part of solution to three parts of ore is used. In those exceptional cases the amount of solution should be increased, so that the amount of oxygen will really be an excess. When, however, the ore, &c., does not contain more than one and one-half ounces of gold per ton and only one-third solution is used, the maximum amount of dissolved oxygen will be an excess over the amount required, and, as a rule, ores, &c., which are treated by the leaching process contain less than one and one-half ounces of gold per ton, while richer products are generally treated by agitation. Also more solution is used.

I am aware that it has been tried to supply the required amount of oxygen to the cyanid solution by means of passing compressed air through the solution or through the pulp saturated with the cyanid solution.

The advantages of my process over the compressed-air system are—

First. The necessary apparatus is cheaper and more easily constructed as compared with an air-compressor plant and a system of pipes through the different vats, and the process is more economical in practice. In the actual test on a large scale that I have made my system requires less than one-horse power, where the compressed-air system requires twenty-five-horse power.

Second. It is more efficient and quicker in results. A larger amount of oxygen is more quickly dissolved, and being equally distributed through the whole mass of liquid it is more efficient by being available throughout the whole mass of the pulp.

Third. With the compressed-air system the air rising through the pulp and solution forms channels. Only in the immediate neighborhood of these channels the gold is quickly dissolved. In other parts of the vats the dissolving goes on slowly, while with my system no channels are formed and the solution of the gold is as quick as it possibly can be throughout the whole mass.

Fourth. The compressed-air system has many mechanical drawbacks, such as choking of the air-pipes by the pulp, inability of air to rise through the mass, which makes it necessary to punch holes from the top of the vat. These disadvantages are altogether absent from my process.

I am also aware that it has been tried to supply the required amount of oxygen by means of chemicals, which adds materially to the cost of treatment and often puts the cyanid solution in a generally bad condition.

The solution when quiescent will absorb some oxygen, but even under favorable conditions will not absorb its maximum amount in a short time. In this connection it should be mentioned that in cyanid practice the cyanid solutions which have done their dissolving work in the leaching-tanks or other apparatus for ore treatment and having there lost all or part of their oxygen on account of the reaction $$2Au + 4KCN + O + H_2O = 2AuKCN_2 + 2KOH$$

are passed through the precipitating apparatus and after addition of the required amount of cyanid used over again immediately for the treatment of ore, &c.

With my process I am independent of bad air in the mills and other unfavorable circumstances. The air-pipe can be run through the roof and take only pure outside air or can be connected with an even better source of oxygen.

With my invention it is easily possible to dissolve the maximum amount of oxygen in two hundred tons solution with one two-inch centrifugal pump, as hereinafter described, in twenty-four hours with the expenditure of one-half-horse power.

The cyanid solutions to be used for the dissolving of gold and silver out of their ores, tailings, concentrates, or other gold-bearing and silver-bearing matter by leaching or by agitation are prepared immediately before being used in the hereinafter-described manner, whereby they will absorb the largest possible amount of oxygen.

I now will proceed to describe the invention in connection with a suitable apparatus for practicing the same.

The accompanying drawing is a side elevation of such an apparatus.

In this drawing the tank A, into which the cyanid solution runs after having passed the zinc boxes (not shown) or other means of precipitation, has at the bottom a pipe B, leading therefrom to a centrifugal pump H. At the place where the suction-pipe B is connected with the center of the pump is also connected an air-pipe D. This air-pipe may be connected with any source of oxygen, though atmospheric air will answer the purpose. The suction-pipe has a valve C and the air-pipe a valve E. The discharge-pipe F discharges the solution into the tank at the opposite side from where the suction draws the solution from the tank. In this manner the solution may be passed repeatedly through the pump and be subjected to the oxygenating action of the air until the desired results are obtained. Before starting the pump the valve E is closed and the valve C opened. When the pump is working, the valve C should be closed so far that in consequence the amount of liquid passing through the pipe is reduced as the friction is increased, and the valve E is opened just sufficiently to allow the proper amount of air to pass through the pipe D. The air being drawn by the suction of the pump is mixed intimately with the solution in the centrifugal pump, so that the solution coming out of the discharge-pipe will contain dissolved oxygen. By connecting the air-pipe D below the valve E with a vacuum-gage (not shown) it is possible to measure the suction by closing the valve E. The air-pipe D may also be connected above and below the valve E with a water-gage, (not shown,) which shows the difference in pressure of the atmosphere and in the air-pipe. By regulating the friction in the suction-pipe by means of the valve C and regulating the supply of air or oxygen by means of the valve E, as indicated by the volume of solution discharged and the vacuum and water gage, the pump can be made to work to the best advantage. The cyanid solution oxygenated by the described process is now used for the extraction of gold and silver and of their ores, tailings, concentrates, or other gold and silver bearing matter by leaching or agitation.

By my improved process the solution of cyanid of potassium is brought into a condition whereby it can dissolve gold and silver from their ores in a minimum of time. It will also be observed that the quantity of air or oxygen introduced into the moving liquid is under perfect control.

Having thus described my invention, what I claim is—

1. The herein-described process consisting in setting in motion a solution of cyanid of potassium, introducing oxygen repeatedly to the moving liquid, and finally subjecting precious-metal-bearing material to the action of the solution thus prepared, substantially as described.

2. The herein-described process of setting in motion a solution of cyanid of potassium by suction, introducing oxygen repeatedly to the moving liquid, and finally subjecting precious-metal-bearing material to the action of the said solution, substantially as described.

3. The herein-described process of treating material containing the precious metals, consisting in setting in motion in an endless path a solution of cyanid of potassium, introducing oxygen to the moving liquid, and finally subjecting the metal-bearing material to the action of said solution, substantially as described.

4. The herein-described process for the treatment of material containing the precious metals, consisting in setting in motion in an endless path a solution of cyanid of potassium, introducing atmospheric air to the moving liquid for a suitable period and finally subjecting the metal-bearing material to the solution thus prepared.

5. The herein-described process consisting in imparting rotary motion to a solution of cyanid potassium, introducing oxygen to the moving liquid at the center of rotation and finally subjecting precious-metal-bearing material to the action of the solution thus prepared.

In testimony whereof I affix my signature in presence of two witnesses.

BASTIAAN WILLEM BEGEER.

Witnesses:
JULIUS J. RUFEE,
W. H. H. HOWER.